US005894046A

United States Patent [19]

Kim et al.

[11] Patent Number: 5,894,046

[45] Date of Patent: Apr. 13, 1999

[54] DOUBLE-PLY CORRUGATED PAPERBOARD

[75] Inventors: Do Wook Kim, Seoul; Ki Jeong Kim, Kyungki-do, both of Rep. of Korea

[73] Assignee: Daeyoung Packaging Co., Ltd., Kyungki-do, Rep. of Korea

[21] Appl. No.: 08/750,490

[22] PCT Filed: Jul. 31, 1995

[86] PCT No.: PCT/KR95/00098

§ 371 Date: Dec. 11, 1996

§ 102(e) Date: Dec. 11, 1996

[87] PCT Pub. No.: WO96/32249

PCT Pub. Date: Oct. 17, 1996

[30] Foreign Application Priority Data

Apr. 11, 1995 [KR] Rep. of Korea .......................... 95/8323

[51] Int. Cl.[6] .............................. B32B 3/28; B32B 27/14; B65C 9/25; A01J 21/00

[52] U.S. Cl. .......................... 428/182; 428/178; 428/184; 428/198; 156/210; 156/290; 156/292; 156/322; 425/336; 425/363

[58] Field of Search .................................... 428/182, 184, 428/178, 198; 156/205, 210, 290, 292, 295, 322; 425/363, 171, 336, 369, 373; 493/463

[56] References Cited

U.S. PATENT DOCUMENTS

| | | | |
|---|---|---|---|
| 1,119,146 | 12/1914 | Ferres | 428/184 |
| 3,935,360 | 1/1976 | Brown | 428/184 |
| 4,228,943 | 10/1980 | Tanabe et al. | 428/184 |

*Primary Examiner*—Donald Loney
*Attorney, Agent, or Firm*—Banner & Witcoff, Ltd.

[57] ABSTRACT

A high strength double-ply corrugated paperboard including upper (102) and lower (106) liners and multiple-ply corrugated mediums (101, 104) disposed between the liners (102, 106), thereby capable of exhibiting a high compressive strength while having a small thickness to minimize the packaging size, and effectively absorbing outside shock applied to the package to keep the packaged goods more safe.

21 Claims, 5 Drawing Sheets

DOUBLE-PLY CORRUGATED PAPERBOARD

TECHNICAL FIELD

The present invention relates in general to paperboards used for packaging goods and, more particularly, to a high strength double-ply corrugated paperboard including upper and lower liners and multiple-ply corrugated mediums disposed between the liners, thereby capable of exhibiting a high compressive strength while having a small thickness to minimize the packaging size, and effectively absorbing outside shock applied to the package to keep the packaged goods more safe.

BACKGROUND ART

As well known to those skilled in the art, various fragile goods needing to be handled with care, for example expensive bottled cosmetics, electronic and electric products such as television sets, are conventionally packaged using rigid boxes with shock-absorbing materials. The above shock-absorbing materials are used for absorbing the outside shock applied to the packaged goods and thereby protect the goods from the shock.

In the prior art, both expanded polystyrene formed according to the contours of the goods to be packaged and cardboard mounts folded into given shapes or partially cut out sufficient enough to hold the goods in the package boxes are generally used as shock-absorbing materials. When the goods to be packaged are heavy goods such as refrigerators, the packaging materials for such goods need to be provided with both excellent shock absorption and rigidity sufficient enough to absorb the outside shock and to bear the weight of the heavy goods. In order to achieve the above object, the package boxes for such heavy goods are preferably bottomed with wooden pallets.

The expanded polystyrene used as a shock-absorbing material has an advantage in that it is easily formed and suitable for mass production. However, the expanded polystyrene is breaks easily and induces static electricity. Therefore, the expanded polystyrene not only causes environmental contamination due to its broken pieces, but also is scarcely used for packaging precision goods due to the static electricity. Otherwise stated, use of the expanded polystyrene as the shock-absorbing material is limited as it remarkably reduces the expected life of the packaged goods.

The cardboard mounts folded into given shapes or partially cut out sufficient enough to hold the goods in the package boxes are problematic in that they are not suitable for mass production. Furthermore, the above cardboard mounts have inferior durability and generate paper dust while packaging the goods. Due to the inferior durability as well as the paper dust, the above cardboard mounts may exert a bad influence upon the expected life of the packaged goods.

In order to rectify the above problems, package cases formed using pulp molds have been recently proposed and used. However, the above package cases need to be formed using individual molds even when the cases are produced on a small scale. As the molds should be produced by highly skilled workers one by one, the package cases are problematic in that it is very difficult to produce the cases. Another problem of the above package cases is resided in that they are expensive.

As people are recently becoming environmentally conscious, used packaging materials need appropriate treating to prevent them from causing environmental contamination. However, it has been noted that treatment of various plastic packaging materials such as expanded polystyrene is very difficult as the above plastic packaging materials can not be recycled. The above plastic packaging materials will cause environmental contamination and exert a bad influence upon the ecosystem when they are simply discarded. Therefore, environmentally conscious people tend to avoid using such plastic packaging materials. Thus, demand for the above plastic packaging materials is reduced.

DISCLOSURE OF THE INVENTION

It is, therefore, an object of the present invention to provide a high strength corrugated paperboard in which the above problems can be overcome and which has an improved structure suitable for not only reliably protecting the packaged goods, but also improving durability of the packaging paper sheet.

It is another object of the present invention to provide a double-ply corrugated paperboard having a value-added structure including multiple-ply corrugated mediums with different corrugation pitches and heights disposed between upper and lower liners, thereby capable of exhibiting a high compressive strength while having a small thickness to minimize the packaging size.

It is a further object of the present invention to provide a cheap and regenerable corrugated paperboard which is not made of materials causing environmental contamination, but made of regenerable paper, and which can be produced through an automatic process.

In order to accomplish the above objects, the present invention provides a double-ply corrugated paperboard comprising: a liner having opposite smooth surfaces; a first corrugated medium having continuous corrugations with a predetermined corrugation pitch and a predetermined corrugation height, the first corrugated medium being laminated on one surface of the liner, thereby forming a single-faced corrugated paperboard; and a second corrugated medium having continuous corrugations with a predetermined corrugation pitch and a predetermined corrugation height, the second corrugated medium being laminated on the first corrugated medium of the single-faced corrugated paperboard, whereby the double-ply corrugated paperboard has an improvement in shock absorptivity and an enhancement in the compressive strength against a vertical load.

In accordance with an embodiment of the present invention, the first and second corrugated mediums have the same corrugation pitch, but have different corrugation heights to define continuous shock absorbing spaces therebetween.

In accordance with another embodiment of the present invention, the first and second corrugated mediums have the same corrugation pitch and height, but have different curvatures to define a pair of shock absorbing spaces therebetween for every corrugation. Alternatively, the first and second corrugated mediums have different corrugation pitches such that the corrugation pitch of the second corrugated medium corresponds to two times the corrugation pitch of the first corrugated medium. The first and second corrugated mediums may also have the same corrugation pitch and height such that they are completely in contact with each other to construct a double-ply corrugated structure having enhancements in compressive strength and stiffness. The double-ply corrugated paperboard may further comprise a pair of corrugated mediums respectively having the same constructions as the first and second corrugated mediums and laminated on the other surface of the liner. The double-ply corrugated paperboard may further comprises at least one corrugated medium laminated on the second corrugated medium.

The present invention also provides a method for producing a double-ply corrugated paperboard comprising the steps of: bonding, to a smooth liner, a first corrugated medium having continuous corrugations with a predetermined corrugation pitch and a predetermined corrugation height, and then pressing the first corrugated medium together with the liner by a press belt, thereby forming a single-faced corrugated paperboard; feeding the single-faced corrugated paperboard to a single-faced corrugated paperboard forming station, and then laminating, on the single-faced corrugated paperboard, a second corrugated medium having continuous corrugations with a predetermined corrugation pitch and a predetermined corrugation height such that corresponding corrugations of the first and second corrugated medium are overlapped with each other, thereby forming double-ply corrugated paperboard; guiding the double-ply corrugated paperboard to a paper guide, thereby controlling a feeding speed of the double-ply corrugated paperboard; pre-heating the double-ply corrugated paperboard being continuously fed while maintaining the double-ply corrugated paperboard in a uniformly tensed state; supplying a cover liner in parallel to the double-ply corrugated paperboard passing through the paper guide, along a path defined beneath the double-ply corrugated paperboard; continuously coating an adhesive on facing surfaces of the double-ply corrugated paperboard and cover liner; guide the adhesive-applied double-ply corrugated paperboard and cover liner along a heating plate; and pressing the double-ply corrugated paperboard and cover liner at a predetermined pressure during the double-ply corrugated paperboard and cover liner are fed along the heating plate, thereby bonding the double-ply corrugated paperboard and cover liner together.

The step of laminating the second corrugated medium on the single-faced corrugated paperboard further comprises the steps of: sensing a position of each corrugation on the single-faced corrugated paperboard; comparing the sensed corrugation position with a position of each corresponding corrugation of the second corrugated medium; and controlling a feeding speed of the single-faced corrugated paperboard on the basis of the result of the comparison.

The present invention also provides an apparatus for producing a double-ply corrugated paperboard comprising: a medium supply roll and a liner supply roll respectively supplying a continuous, first medium and a continuous liner; first single-faced corrugated paperboard forming means adapted to receive the first medium and the liner respectively from the medium supply roll and the liner supply roll, to corrugate the medium and to bond the first, corrugated medium to the liner, thereby forming a single-faced corrugated paperboard; second single-faced corrugated paperboard forming means adapted to receive the single-faced corrugated paperboard from the first single-faced corrugated paperboard forming station and a continuous, second medium from another medium supply roll, to corrugate the second medium, to bond the corrugated, second medium to the single-faced corrugated paperboard, thereby forming a double-ply corrugated paperboard; a paper guide arranged downstream the second single-face corrugated paperboard forming means and adapted to control a feeding speed of the double-ply corrugated paperboard; a tension roll and pre-heating means both arranged downstream the paper guide and adapted to apply a constant tension to the double-ply corrugated paperboard being continuously fed; a cover liner supply roll arranged upstream the pre-heating means and adapted to supply a continuous cover liner along a path parallel to the double-ply corrugated paperboard passing through the paper guide; adhesive coating means adapted to continuously coat an adhesive on facing surfaces of the cover liner and second corrugated medium of the double-ply corrugated paperboard; and a heating plate and pressing belt means both adapted to press the adhesive-applied double-ply corrugated paperboard and cover liner at a predetermined pressure while heating them, thereby bonding them together.

Each of the first and second single-faced corrugated paperboard forming means comprises: a pair of vertically arranged corrugator rollers adapted to guide the corresponding medium therebetween and to corrugate the guided medium to have a desired wave; an adhesive coating roller arranged on one side of the upper one of the corrugator rollers and adapted to uniformly coat an adhesive on one surface of the corrugated medium; and a laminating unit constituted by a press belt and a pair of belt driving rolls all disposed above the upper corrugator roller and adapted to bring the liner in the case of the first forming means or the single-faced corrugated paperboard in the case of the second forming means into contact with the corrugated medium passing over the upper corrugator roller.

BRIEF DESCRIPTION OF DRAWINGS

The above and other objects, features and other advantages of the present invention will be more clearly understood from the following detailed description taken in conjunction with the accompanying drawings, in which:

FIGS. 4A to 4E are sectional views respectively illustrating paperboards produced in accordance with a paperboard producing method of the present invention wherein FIG. 4A shows a single-faced corrugated paperboard structure including a single corrugated medium, FIG. 4B shows a double-ply corrugated paperboard structure including a pair of corrugated mediums with the same corrugation pitch, but different corrugation heights, FIG. 4C shows a double-ply corrugated paperboard structure including a pair of corrugated mediums with the same corrugation pitch and height, but different curvatures, FIG. 4D shows a double-ply corrugated paperboard structure including a pair of corrugated mediums with different corrugation pitches, and FIG. 4E shows a double-ply corrugated paperboard structure including a pair of corrugated mediums with the same corrugation pitch and height to be completely in contact with each other.

FIG. 5A is a sectional view showing the position of the bonded portions formed between two corrugated mediums and the liners of the paperboard in accordance with an embodiment of this invention.

FIG. 5B is a sectional view of a high-elastic corrugated paperboard having bonded portions selectively formed on some of the contact portions between the corrugated mediums and the liners of the paperboard in accordance with another embodiment of this invention.

BEST MODE FOR CARRYING OUT THE INVENTION

Figure 1:
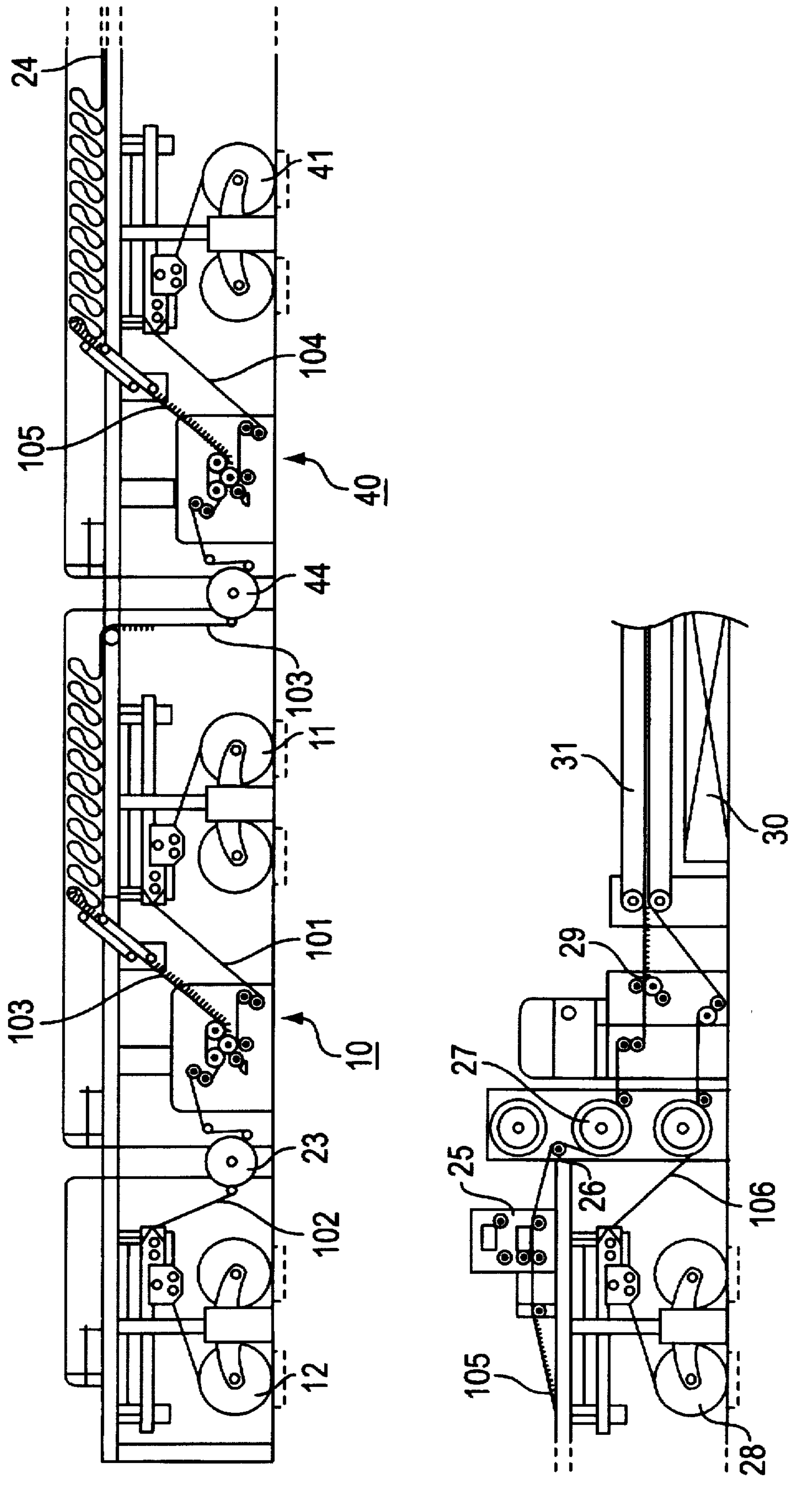
FIG. 1 is a schematic view illustrating an apparatus for producing a double-ply corrugated paperboard in accordance with the present invention.
Figure 2:
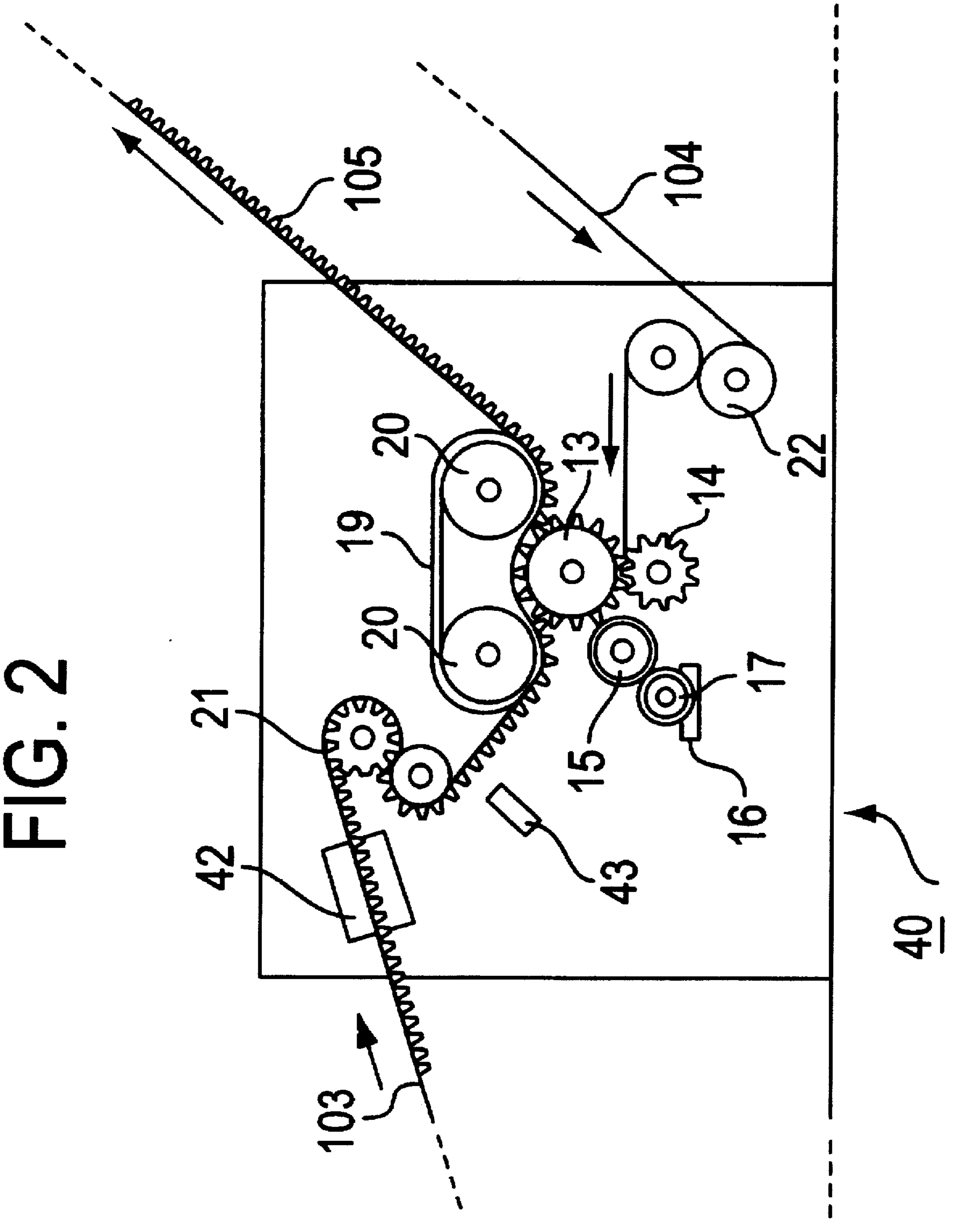
FIG. 2 is a schematic view illustrating a single-faced corrugated paperboard forming station included in the apparatus of the present invention.
Figure 3:
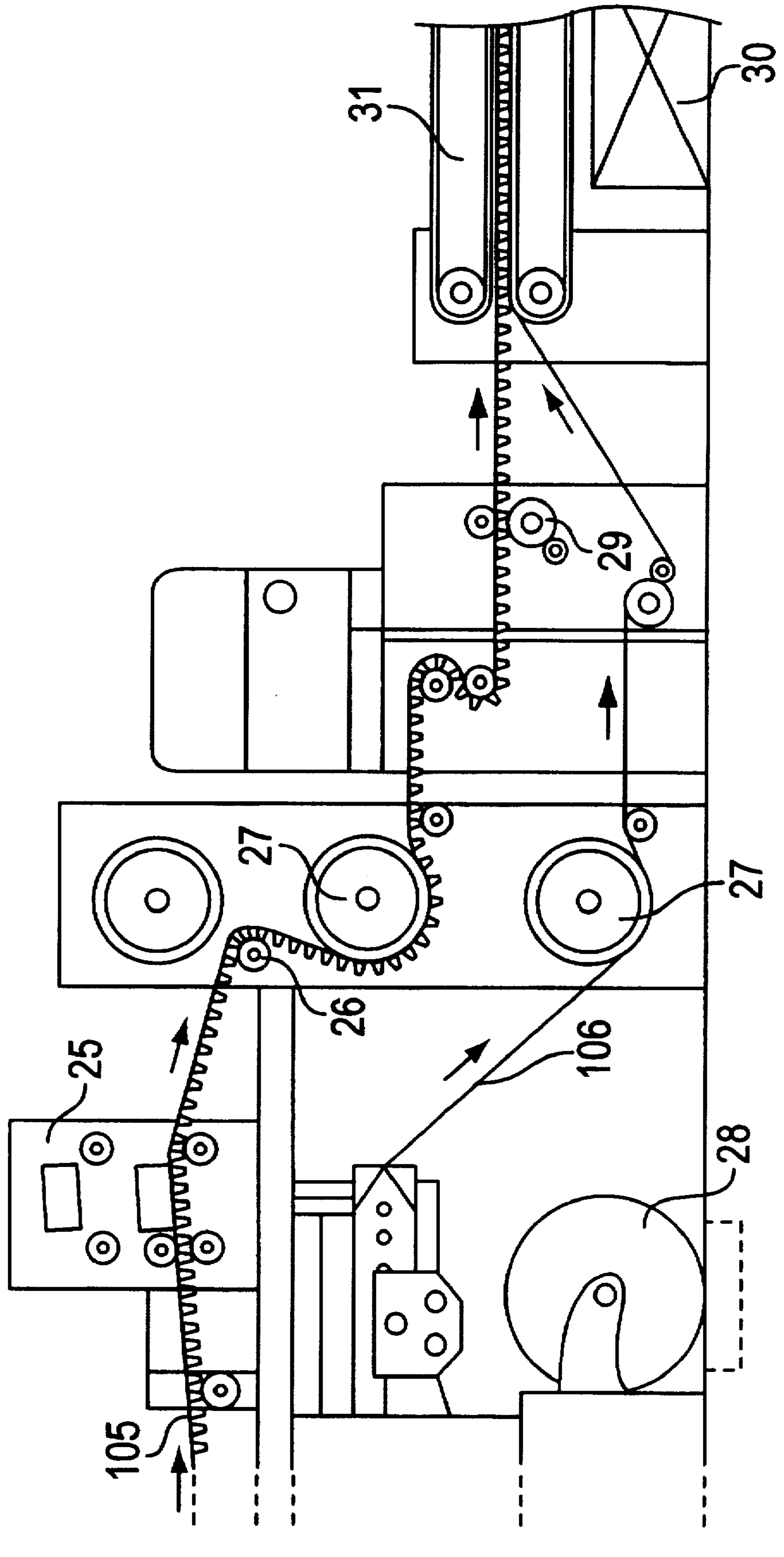
FIG. 3 is a schematic view illustrating a single-faced double-ply paperboard forming station included in the apparatus of the present invention.

FIGS. 1 to 3 illustrate an apparatus for producing a continuous double-ply corrugated paperboard in accordance with the present invention, respectively.

As shown in FIGS. 1, the apparatus for producing a continuous double-ply corrugated paperboard includes a first single-faced corrugated paperboard forming station 10 which receives a medium 101 and a liner 102 from a medium supply roll 11 and a liner supply roll 12, respectively, and forms a single-faced corrugated paperboard 103. Although the construction of the first single-faced corrugated paperboard forming station 10 is not shown in FIG. 1 in detail, it can be clearly understood by referring to FIG. 2 which shows a second single-faced corrugated paperboard forming station 40 having the same construction as the first single-faced corrugated paperboard forming station 10. The first single-faced corrugated paperboard forming station 10 includes a pair of corrugator rollers 13 and 14 adapted to guide the medium 101 therebetween and to corrugate the medium 101 to have a desired wave, an adhesive coating roller 15 arranged on one side of the upper corrugator roller 13 and adapted to uniformly coat an adhesive on one surface of the medium 101, and a laminating unit constituted by a press belt 10 and a pair of belt driving rolls 20 all disposed above the upper corrugator roller 13 and adapted to bring the liner 102 fed from the liner supply roll 12 into contact with the corrugated medium 101 passing over the corrugator roller 13. Between the liner supply roll 12 and the corrugator roller 13, a speed-adjustable accelerating roll 21 is arranged to adjust the speed of the liner 102 fed toward the corrugator roller 13. Guide tension rolls 22 are also disposed between the medium supply roll 11 and the corrugator roller 13 or 14 to apply a desired tension to the medium 101 fed toward the corrugator roller.

The corrugator rollers 13 and 14 are vertically arranged to engage with each other such that a regular wave of the medium 101 is continuously formed. The upper corrugator roller 13 is provided at its outer corrugated surface with a plurality of suction holes (not shown) arranged along each groove of the roller 13. When the medium 101 to be bond to the liner 102 passes between the corrugator rollers 13 and 14, it is in close contact with the corrugated surface of the corrugator roller 13 by a strong suction applied thereto through the suction holes so that it can maintain its desired wave shape. In other words, the suction holes serve to maintain the corrugated shape of the medium 101, which is corrugated to have the desired wave while passing between the corrugator rollers 13 and 14, without any damage until the corrugated medium 101 is bonded to the liner 102. The suction is continuously applied to the medium 101 until the medium 101 reaches a position where it comes into contact with the liner 102.

It is preferred that the corrugator rollers 13 and 14, which corrugate the medium 101 fed from the medium supply roll 11 to have corrugations having a desired pitch and a desired height, are of a cartridge type enabling a replacement thereof. In this case, it is possible to continuously produce a corrugated paperboard having various waves with different corrugation heights and pitches as shown in FIGS. 4A to 4E by simply replacing the corrugator rollers 13 and 14 by new ones without any replacement of the entire single-faced corrugated paperboard forming station.

As shown in FIG. 2, the adhesive coating roller 15, which applies an adhesive to one surface of the corrugated medium 101 on one side of the upper corrugator roller 13, is preferred to be in contact with an adhesive transfer roller 17 which is dipped in an adhesive storage tank 16 filled with the adhesive. As the adhesive coating roller 15 rotates, the adhesive on the adhesive transfer roller 17 is transferred to the adhesive coating roller 15. With such a construction, the adhesive can be rapidly transferred to the corrugated medium 101.

Alternatively, another adhesive coating means may be used. For example, a nozzle-attached plate construction may be used which includes a plurality of nozzles aligned in a line with one another. In this case, selected one of the nozzles are opened depending on the shape of the corrugated medium so that the width and space of adhesive coatings on the corrugated medium can be optionally adjusted. In addition to the adhesive transfer roller 17, a separate dipping roller may be provided which is dipped in the adhesive storage tank 16. In this case, the adhesive transfer roller 17 is arranged between the dipping roller and the adhesive coating roller 15 so that it can transfer the adhesive from the dipping roller 18 to the adhesive coating roller 15. In this case, it is possible to more uniformly apply the adhesive to the corrugated medium 101.

Upstream the first single-faced corrugated paperboard forming station 10, a pre-heating unit 23 is arranged, as shown in FIG. 1. The pre-heating unit 23 serves to pre-heat the liner 102 to a temperature required for the bonding before the liner 102 is fed to the first single-faced corrugated paperboard forming station 10. Downstream the first single-faced corrugated paperboard forming station 10, the second single-faced corrugated paperboard forming station is arranged which is denoted by the reference numeral 40 and has the same construction as the first single-faced corrugated paperboard forming station 10.

The second single-faced corrugated paperboard forming station 40 is supplied with the single-faced corrugated paperboard 103 emerging from the first single-faced corrugated paperboard forming station 10 in place of the liner. The second single-faced corrugated paperboard forming station 40 bonds another corrugated medium 104 fed from a medium supply roll 41 to the single-faced corrugated paperboard 103. In this regard, the second single-faced corrugated paperboard forming station 40 has the same construction as the first single-faced corrugated paperboard forming station 10 except that it receives the single-faced corrugated paperboard 103 in place of the liner. In other words, the second single-faced corrugated paperboard forming station 40 does not require any separate liner supply roll.

Similarly to the liner 102 guided to the first single-faced corrugated paperboard forming station 10, the single-faced corrugated paperboard 103 guided to the second single-faced corrugated paperboard forming station 40 passes over a pre-heating unit 44 so that it can be pre-heated to a temperature required for the bonding thereof.

Upstream the speed-adjustable accelerating roll 21 of the second single-faced corrugated paperboard forming station 40, a suction brake 42 is arranged to control the speed of the single-faced corrugated paperboard 103 fed to the upper corrugator roller 13 of the second single-faced corrugated paperboard forming station 40.

The suction brake 42 is controlled by a corrugation position sensor 43 disposed between the speed-adjustable accelerating roll 21 and the press belt 19 in the second single-faced corrugated paperboard forming station 40.

In other words, the corrugation position sensor 43 senses positions of corrugations of the single-faced corrugated paperboard 103 between the speed-adjustable accelerating roll 21 and the press belt 19 so that the corrugation position of the single-faced corrugated paperboard 103 can coincide with the corrugation position of the corrugated medium 104 at the upper corrugator roller 13 of the second single-faced corrugated paperboard forming station 40.

A paper guide 25 is arranged at the exit of the second single-faced corrugated paperboard forming station 40 in order to control the feeding speed of a single-faced double-ply corrugated paperboard 105 with two corrugated mediums 101 and 104 bonded thereto, as shown in FIGS. 1 and 3.

By the provision of the paper guide 25, the single-faced double-ply corrugated paperboard 105 can be freely fed along a bridge 24 under a uniformly tensed condition. Downstream the paper guide 25, a tension roll 26 and pre-heating units 27 are installed.

The tension roll 26 and one pre-heating unit 27 serve to apply a sufficient tension to the single-faced double-fly corrugated paperboard 105 whereas the other pre-heating unit 27 serves to apply a sufficient tension to a liner 106 which will be bonded to the single-faced double-ply corrugated paperboard 105. Adhesive coating units 29 are disposed downstream the pre-heating units 27 to apply an adhesive to the outer corrugated medium of the single-faced double-ply corrugated paperboard 105 and the liner 106, respectively. A heating plate 30 and a pair of press belts 31 are arranged downstream the pre-heating units 27. The single-faced double-ply corrugated paperboard 105 and liner 106 both applied with the adhesive are fed through a gap defined between the press belts 31 and pressed against each other by a uniform pressure provided by the press belts 31 while being heated by the heating plate 30. Thus, a double-ply corrugated paperboard having a good quality can be produced.

Now, operation of the apparatus having the above-mentioned arrangement in accordance with the present invention will be described.

As the first single-faced corrugated paperboard forming station 10 receives the first medium 101 and the first liner 102 respectively from the medium supply roll 11 and the liner supply roll 12, it corrugates the medium 101 to have a desired corrugation pitch and a desired corrugation height and then bonds the corrugated medium 101 to the smooth liner 102 while pressing them by means of the press belt 19, thereby forming the single-faced corrugated paperboard 103.

Since the press belt 19 is constructed to surround a pair of belt driving rolls 20 and to press the upper portion of the upper corrugator roller 13 at its lower portion, it is possible to effectively prevent any press roll mark from being formed on the single-faced corrugated paperboard 103 being produced.

The single-faced corrugated paperboard 103 emerging from the first single-faced corrugated paperboard forming station 10 is fed to the second single-faced corrugated paperboard forming station 40 which, in turn, bonds the second medium 104, which has been corrugated, to the single-faced corrugated paperboard 103, thereby forming the single-faced double-ply corrugated paperboard 105 with the paperboard 103 and second corrugated medium 104 laminated together.

In the formation of this single-faced double-ply corrugated paperboard 105, it is desirable to accurately control the speed of the corrugator rollers and the speed-adjustable accelerating roll, thereby more accurately adjusting the corrugation pitch. This can be achieved by correcting a deviation generated between an AC servo motor (not shown) for driving the speed-adjustable accelerating roll and an AC servo motor (not shown) for driving the corrugator rollers. This deviation correction can be achieved by counting pitches of the servo motors by sensors, operating data generated by the sensors every counting time, deriving speed data from a phase difference based on the result of the operation, and then transmitting the speed data to a servo amplifier for controlling one or two servo motors. Alternatively, the relative feeding speeds of the single-faced corrugated paperboard and the second medium may be controlled by continuously checking the cross-section of the single-faced corrugated paperboard at intervals of 1/1,000 to 1/10,000 second by a super-high speed camera (image), transferring an instant corrugation pitch error in the form of image data to a central processing unit, deriving speed data from a phase difference based on the instant corrugation pitch error, and then transmitting to a servo amplifier for controlling AC servo motors for the speed-adjustable accelerating roll and corrugator rollers.

This single-faced double-ply corrugated paperboard 105 from the second single-faced corrugated paperboard forming station 40 is guided to the paper guide 25 which controls the feeding speed of the paperboard 105. After passing through the paper guide 25, the single-faced double-ply corrugated paperboard 105 passes over the tension roll 26 and the pre-heating unit 27 associated therewith. As a result, the paperboard 105 is maintained at a tensed state while being pre-heated at its surface to a desired temperature.

During the single-faced double-ply corrugated paperboard 105 is fed through the paper guide 25, the second liner 106 is fed in parallel to the paperboard 105 beneath the feeding path of the paperboard 105. Both the paperboard 105 and the second liner 106 are then fed to the nip between the press belts 31. Before the paperboard 105 and the second liner 106 reach the press belts 31, they are coated with an adhesive. As the paperboard 105 and the second liner 106 pass through the nip between the press belts 31, they are pressed against each other by the press belts 31 while being heated by the heating plate 30 disposed beneath the press belts 31. Accordingly, the paperboard 105 and the second liner 106 are firmly bonded together. Thus, a desired double-ply corrugated paperboard is produced.

For accurately laminating the second corrugated medium 104 on the single-faced corrugated paperboard 103 bonded with the corrugated medium 101, it is required to accurately sense the position of each corrugation on the paperboard 103, compare the sensed corrugation position with the position of each corresponding corrugation of the second corrugated medium 104 and thereby controlling the feeding speed of the single-faced corrugated paperboard 103.

The double-ply corrugated paperboard produced through the above procedures in accordance with the present invention can have various shapes and constructions as shown in FIGS. 4B to 4E. This can be accomplished by appropriately varying the dimensions of the corrugator rollers 13 and 14 provided at the first and second single-faced corrugated paperboard forming stations 10 and 40.

Figure 4A:
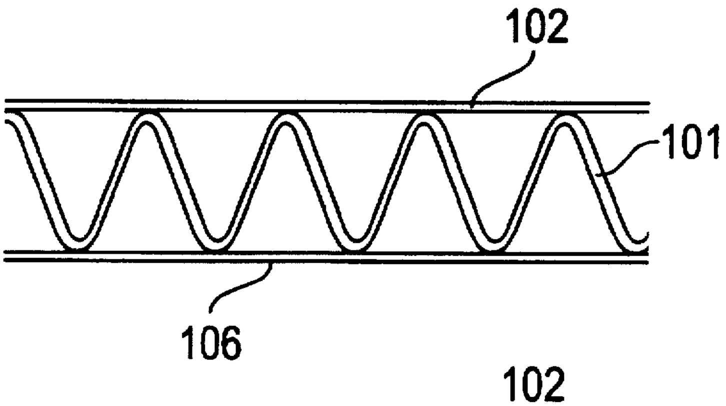
Figure 4B:
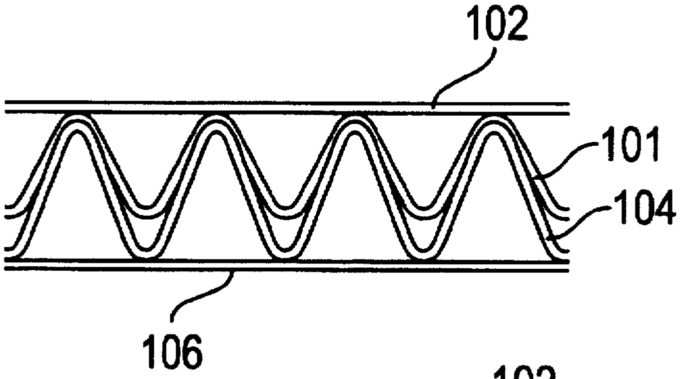

Of factors determining the dimensions of the corrugator rollers 13 and 14 required for producing a desired double-ply corrugated paperboard, the most important one is the ratio between the corrugation pitch of the lower corrugations and the corrugation pitch of the upper corrugations. This corrugation pitch ratio determines the shock absorptivity and durability of the final product, namely, the double-ply corrugated paperboard.

Where only the first single-faced corrugated paperboard forming station 10 is driven while stopping the second single-faced corrugated paperboard forming station 40, a single-ply corrugated paperboard having a conventional shape is produced which includes the single-faced corrugated paperboard 103 with the corrugated medium 101 and the liner 102, and the liner 106 laminated on the paperboard 103, as shown in FIG. 4A. On the other hand, where both the first and second single-faced corrugated paperboard forming stations 10 and 40 are driven while varying the dimensions of the corrugator rollers 13 and 14 thereof, various double-ply corrugated paperboards having different constructions can be produced, as shown in FIGS. 4B to 4E.

Where a double-ply corrugated paperboard having upper and lower corrugations with the same corrugation pitch, but with different corrugation heights is to be produced, as shown in FIG. 4B, it is required to use, for the first and second forming stations 10 and 40, two different sets of corrugator rollers 13 and 14 having a corrugation pitch ratio of 1:1, namely, the same corrugation pitch, but having different corrugation heights.

Figure 4C:
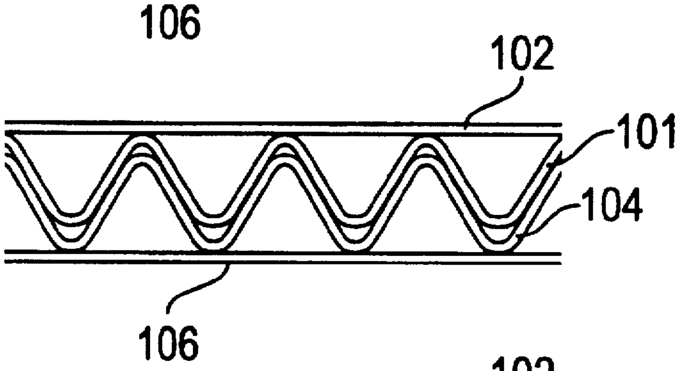
Figure 4D:
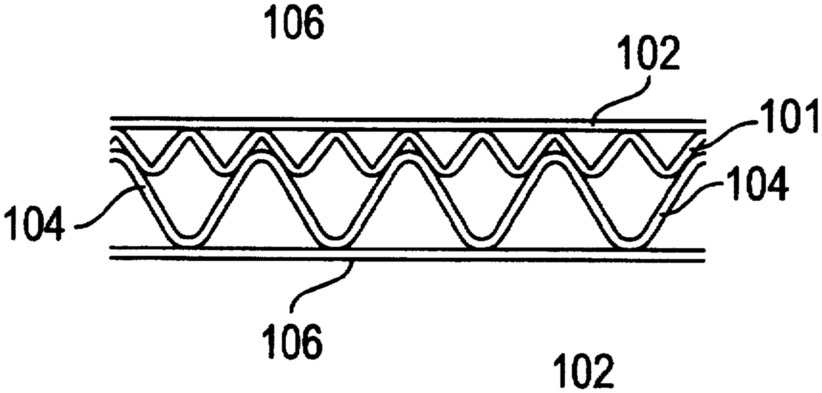

In this case, the double-ply corrugated paperboard has a space defined between facing upper and lower corrugations by virtue of different corrugation heights, as shown in FIG. 4B. When this double-ply corrugated paperboard is subjected to a shock from the outside, the shock is primarily absorbed by the space. For a higher shock, it is secondarily absorbed by the lower corrugated medium 101 of the double-ply corrugated paperboard. Thus, the shock absorption is effectively achieved.

Where a double-ply corrugated paperboard having upper and lower corrugations with the same corrugation pitch and the same corrugation height is to be produced, as shown in FIG. 4C, two identical sets of corrugator rollers 13 and 14 having the same corrugation pitch and the same corrugation height are used for the first and second forming stations 10 and 40, respectively. In this case, however, it is required to form corrugations constituted by alternating crests and valleys both having different curvatures at their peaks from each other so that the upper and lower corrugations have spaces defined between each valley and each crest overlapping with the valley. Here, the valleys are corrugation portions bonded to the corresponding liner at their peaks. In this case, a variety of shock absorption effects can be expected by varying the corrugation shape and the corrugation height.

Where a double-ply corrugated paperboard in which its upper corrugations have a corrugation pitch corresponding to 2 times that of its lower corrugations is to be produced, as shown in FIG. 4D, it is required to use, for the first and second forming stations 10 and 40, two different sets of corrugator rollers 13 and 14 having a corrugation pitch ratio of 2:1.

In this case, each valley of the lower corrugated medium 104 having a larger corrugation pitch overlaps with two successive crests of the upper corrugated medium 101 having a smaller corrugation pitch. When this double-ply corrugated paperboard is subjected to a load from the outside, each valley of the lower corrugations is pushed toward the valley defined between the corresponding crests of the upper corrugations. Simultaneously, the crests of the upper corrugations are pushed into the corresponding valley of the lower corrugations. When the load is released before the elastic limit of the upper and lower corrugated mediums 101 and 104, the strain is completely removed so that the corrugated mediums 101 and 104 can return to their original states, respectively. In this case, accordingly, the double-ply corrugated paperboard can have a durable shock absorptivity.

Figure 4E:
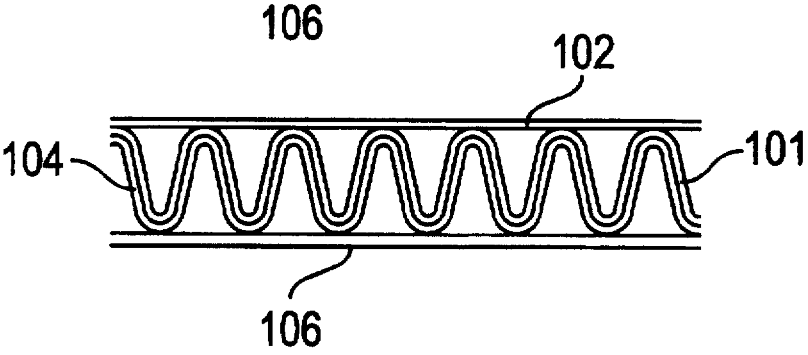

On the other hand, in a case of a double-ply corrugated paperboard in which its upper and lower corrugated mediums 101 and 104 are completely in contact with each other, as shown in FIG. 4E, it achieves an improvement in the compressive strength against an axial load and an increase in bending stiffness as well as a shock absorption effect.

In addition, it is preferable to form a double-ply corrugated paperboard in which the upper and lower corrugated mediums 101 and 104 are completely overlapped with respect to each other and are bonded to lines 102 and 106 at their crests and valleys but are not bonded together except for the portions corresponding to the crests and valleys.

In other words, when the two corrugated mediums 101 and 104 are completely bonded together in the junction between them, the strength of the resulting corrugated paperboard is increased dramatically. However, such a corrugated paperboard cannot effectively absorb external shock but regrettably transmits the shock to the packaged material thus sometimes causing the packaged material to break. In this regard, the use of the paperboard has to be limited to the packaging of a material having a high shock resistance.

Figure 5A:
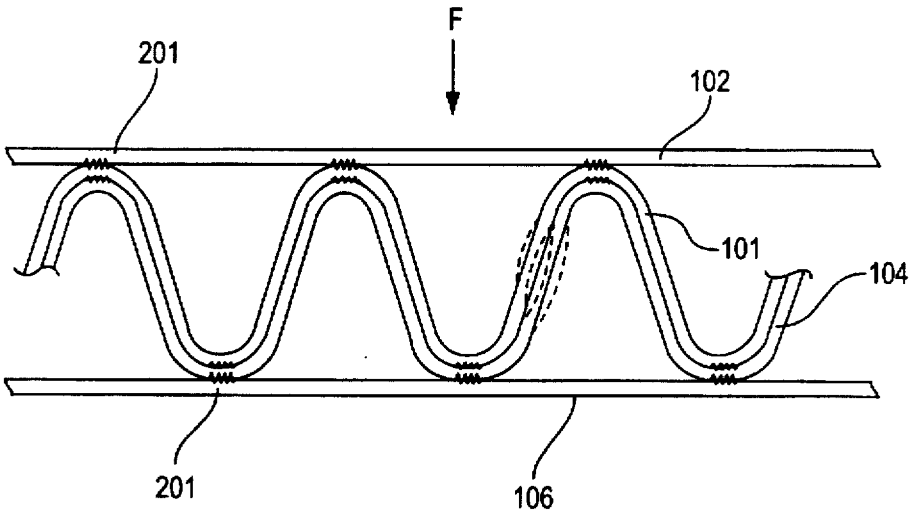
FIGS. 5A and 5B are enlarged sectional views respectively showing the construction of double-ply corrugated paperboards of this invention.

Therefore, it is required to provide a corrugated paperboard which has a desirable compressive strength and quickly absorbs external shock thus preventing a packaged material from breaking. In order to achieve the above object, two corrugated mediums 101 and 104 are arranged to be overlapped with each other as shown in FIG. 5A, thus increasing the resistance against a vertical load. The two corrugated mediums 101 and 104 are bonded to liners 102 and 106 at their crests and valleys but are not bonded together except for the portions corresponding to the crests and valleys, so that the mediums 101 and 104 are allowed to be individually deformed as shown in the dotted line of FIG. 5A when an external shock is applied to the paperboard.

Figure 5B:
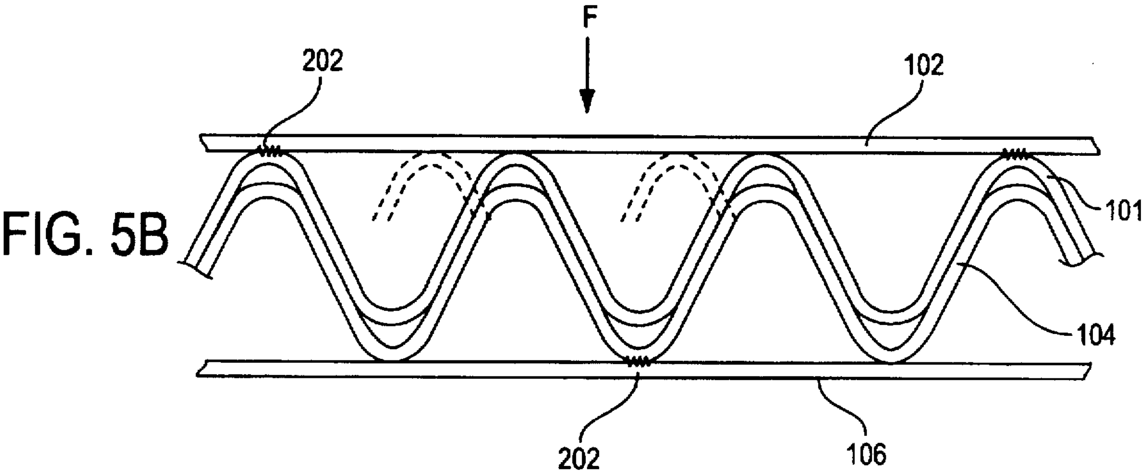

FIG. 5B shows a corrugated paperboard in accordance with another embodiment of the invention. The above corrugated paperboard is effectively used for packaging a material that is hypersensitive of shock. The corrugated paperboard shown in FIG. 5B is produced by bonding some of the crests and valleys of the corrugated mediums 101 and 104 to lines 102 and 106 thus intermittently and repeatedly forming bonded portions 202 in the junctions between the mediums and liners while producing the paperboards of FIGS. 4B to 4E.

In this case, it is preferable to form the bonded portions 202 with at least two nonbonded and movable crests or valleys of a medium remaining between neighboring bonded portions 202.

In the above corrugated paperboard, the nonbonded crests and valleys of the mediums 101 and 104 may freely move relative to liners 102 and 106 within the range defined between the bonded portions 202 a shown in the dotted line of FIG. 5B. Since the nonbonded crests and valleys of the mediums 101 and 104 can move as described above, it is possible to variously change the distribution of the crests or valleys in a unit area thus freely designing the construction of the corrugated paperboard in accordance with characteristics of materials to be packaged. Such a construction of the corrugated mediums 101 and 104 effectively supports a movement of a packaged material in cooperation with the intrinsic durability of liner 102. The above corrugated paperboard is thus effectively used for packaging a material that is easily movable in the package.

It is also possible to laminate a plurality of single-faced double-ply corrugated paperboards having various constructions as above-mentioned in a manner that the corrugations of all the corrugated paperboards face in the same direction or in a manner that the corrugations of adjacent paperboards face in opposite directions. In either case, a variety of shock absorption effects can be expected by virtue of the differences in corrugation shape and corrugation height between adjacent laminated paperboards.

As apparent from the above description, the double-ply corrugated paperboard according to the present invention includes a plurality of corrugated mediums laminated together such that adjacent ones of the corrugated mediums are completely in contact with each other or partially in contact with each other at intervals. In such a laminated structure, even when one of two facing corrugated mediums is damaged due to a shock from the outside, the elasticity and shock absorptivity of the paperboard is still maintained by the other corrugated medium. Moreover, the double-ply corrugated paperboard of the present invention have an internal shock absorptivity provided by its paper material as well as a durability and a stiffness both provided by the wave of its corrugated medium. In terms of the weight, the paperboard of the present invention is considerably light, as compared to conventional wood or synthetic resin pallets. In this regard, the present paperboard has a convenience in use. There is also an advantage that no accident occurs due to a carelessness in handling.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the present invention provides a double-ply corrugated paperboard produced by bonding, to a smooth liner, a first corrugated medium having continuous corrugations with a desired corrugation pitch and a desired corrugation height, thereby forming a single-faced corrugated paperboard, and then laminating, on the single-faced corrugated paperboard, a second corrugated medium having continuous corrugations with a desired corrugation pitch and a desired corrugation height. With such a structure, the double-ply corrugated paperboard of the present invention exhibits an improvement in shock absorptivity and an enhancement in the compressive strength against a vertical load. In accordance with the present invention, the paperboard is entirely made of regenerable paper other than materials causing an environmental contamination. In accordance with the present invention, a plurality of corrugated mediums may be laminated together between upper and lower liners of the paperboard such that adjacent ones of the corrugated mediums are completely in contact with each other or partially in contact with each other at intervals. Accordingly, it is possible to increase the compressive strength of the paperboard and yet maintain a small thickness of the paperboard. By virtue of this advantage, it is possible to provide high value-added paperboards capable of effectively achieving a minimized packaging size. Once the paperboard of the present invention is used for its packaging purpose, it may be reused as shock absorbing materials for packaging after it is collected. In this regard, the present paperboard is a high value-added product. Therefore, the present invention can greatly reduces the expense of the packaging material and contributes to the protection of environment and the reuse of the resource. Since the present paperboard can effectively absorb a shock applied from the outside to a packaged content, it can keep the packaged content more safe.

We claim:

1. A double-ply corrugated paperboard comprising:

a first liner;

a first corrugated medium continuously and automatically laminated onto a surface of the first liner to form a single-faced single-ply corrugated paperboard, said first corrugated medium having predetermined flute pitch and flute peak height, the first corrugated medium is spot-bonded to the liner by applying a bonding agent on junctions between crests of the first corrugated medium and the first liner;

a second corrugated medium continuously and automatically laminated onto the first corrugated medium of the single-faced single-ply corrugated paperboard to form a single-faced double-ply corrugated paperboard, said second corrugated medium having selected flute pitch and flute peak height which are either the same as or different from the flute pitch and flute peak height of the first corrugated medium, respectively, the second corrugated medium being spot-bonded to the first corrugated medium on junctions between crests of the second corrugated medium and crests of the first corrugated medium; and a second liner continuously and automatically laminated onto the second corrugated medium of said single-faced double-ply corrugated paperboard to form a double-faced double-ply corrugated paperboard, the second corrugated medium being spot-bonded to the second liner on junctions between valleys of the second corrugated medium and the second liner.

2. A double-ply corrugated paperboard comprising:

a first liner;

a first corrugated medium continuously and automatically laminated onto a surface of the first liner to form a single-faced single-ply corrugated paperboard, said first corrugated medium having predetermined flute pitch and flute peak height;

a second corrugated medium continuously and automatically laminated onto said single-faced double-ply corrugated paperboard, said second corrugated medium having selected flute pitch and flute peak height which are either the same as or different from the flute pitch and flute peak height of the first corrugated medium, respectively, wherein the first and second corrugated mediums have the same corrugation pitch, but have different corrugation heights to define continuous shock absorbing spaces therebetween; and a second liner continuously and automatically laminated onto said single-faced double-ply corrugated paperboard to form a double-faced double-ply corrugated paperboard.

3. A double-ply corrugated paperboard comprising:

a first liner;

a first corrugated medium continuously and automatically laminated onto a surface of the first liner to form a single-faced single-ply corrugated paperboard, said first corrugated medium having predetermined flute pitch and flute peak height;

a second corrugated medium continuously and automatically laminated onto said single-faced double-ply corrugated paperboard, said second corrugated medium having selected flute pitch and flute peak height which are either the same as or different from the flute pitch and flute peak height of the first corrugated medium, respectively, wherein the first and second corrugated mediums have the same corrugation pitch and height, but have different curvatures to define a pair of shock absorbing spaces therebetween for every corrugation; and a second liner continuously and automatically laminated onto said single-faced double-ply corrugated paperboard to form a double-faced double-ply corrugated paperboard.

4. A double-ply corrugated paperboard comprising:

a first liner;

a first corrugated medium continuously and automatically laminated onto a surface of the first liner to form a single-faced single-ply corrugated paperboard, said first corrugated medium having predetermined flute pitch and flute peak height;

a second corrugated medium continuously and automatically laminated onto said single-faced double-ply corrugated paperboard, said second corrugated medium having selected flute pitch and flute peak height which are either the same as or different from the flute pitch and flute peak height of the first corrugated medium, respectively, wherein the first and second corrugated mediums have different corrugation pitches such that the corrugation pitch of the second corrugated medium corresponds to two times the corrugation pitch of the first corrugated medium; and a second liner continuously and automatically laminated onto said single-faced double-ply corrugated paperboard to form a double-faced double-ply corrugated paperboard.

5. The double-ply corrugated paperboard in accordance with claim 1, wherein the first and second corrugated medium have the same corrugation pitch and height such that they are completely in contact with each other, the second corrugated medium further being spot-bonded to the first corrugated medium on junctions between valleys of the second corrugated medium and valleys of the first corrugated medium.

6. A double-ply corrugated paperboard comprising:

a first liner;

a first corrugated medium continuously and automatically laminated onto a surface of the first liner to form a single-faced single-ply corrugated paperboard, said first corrugated medium having predetermined flute pitch and flute peak height;

a second corrugated medium continuously and automatically laminated onto said single-faced double-ply corrugated paperboard, said second corrugated medium having selected flute pitch and flute peak height which are either the same as or different from the flute pitch and flute peak height of the first corrugated medium, respectively;

a second liner continuously and automatically laminated onto said single-faced double-ply corrugated paperboard to form a double-faced double-ply corrugated paperboard; and a pair of corrugated mediums respectively having the same constructions as the first and second corrugated mediums and laminated on the other surface of the first liner.

7. The double-ply corrugated paperboard in accordance with claim 6, further comprising at least one corrugated medium laminated on the second corrugated medium.

8. A method for producing a double-ply corrugated paperboard comprising the steps of:

providing a first liner to a single-faced single-ply corrugated paperboard forming station;

bonding a first corrugated medium onto the first liner, said first corrugated medium having predetermined flute pitch and flute peak height;

pressing the first corrugated medium and the first liner by a press belt to form a single-faced single-ply corrugated paperboard;

feeding the single-faced single-ply corrugated paperboard to a single-faced double-ply corrugated paperboard forming station;

laminating a second corrugated medium onto the single-faced single-ply corrugated paperboard to form a single-faced double-ply corrugated paperboard, said second corrugated medium having selected flute pitch and flute peak height which are the same as or different from the flute pitch and flute peak height of the first corrugated medium, respectively;

guiding the single-faced double-ply corrugated paperboard to a paper guide a feeding speed of the single-faced double-ply corrugated paperboard;

pre-heating the single-faced double-ply corrugated paperboard in a uniformly tensed state;

supplying a second liner in parallel relationship to the single-faced double-ply corrugated paperboard which passes through the paper guide;

coating adhesive onto the single-faced double-ply corrugated paperboard and/or the second liner;

guiding the adhesive-applied single-faced double-ply corrugated paperboard and the second liner along a heating plate; and pressing the single-faced double-ply corrugated paperboard and the second liner while the single-faced double-ply corrugated paperboard and the second liner are fed along the heating plate to thereby bond the single-faced double-ply corrugated paperboard and the second liner together.

9. The method in accordance with claim 8, wherein the step of laminating the second corrugated medium on the single-faced corrugated paperboard further comprises the steps of:

sensing a position of each corrugation on the single-faced corrugated paperboard;

comparing the sensed corrugation position with a position of each corresponding corrugation of the second corrugated medium; and controlling a feeding speed of the single-faced corrugated paperboard on the basis of the result of the comparison.

10. The method in accordance with claim 8, wherein the step of laminating the second corrugated medium on the single-faced corrugated paperboard further comprises the step of correcting a deviation generated between an AC servo motor for driving a speed-adjustable accelerating roll used to adjust a feeding speed of the single-faced corrugated paperboard and an AC servo motor for driving corrugator rollers used to corrugate and feed the second medium, the deviation correction being achieved by counting pitches of the servo motors by sensors, operating data generated by the sensors every counting time, deriving speed data from a phase difference based on the result of the operation, and then transmitting the speed data to a servo amplifier for controlling one or two servo motors.

11. The method in accordance with claim 8, wherein the step of laminating the second corrugated medium on the single-faced corrugated paperboard further comprises the steps of:

continuously checking the cross-section of the single-faced corrugated paperboard at intervals of 1/1,000 to 1/10,000 second by a super-high speed camera;

transferring an instant corrugation pitch error in the form of image data to a central processing unit;

deriving speed data from a phase difference based on the instant corrugation pitch error; and transmitting the speed data to a servo amplifier for controlling an AC servo motor for driving a speed-adjustable accelerating roll used to adjust a feeding speed of the single-faced corrugated paperboard or an AC servo motor for driving corrugator rollers used to corrugate and feed the second medium.

12. An apparatus for producing a double-ply corrugated paperboard comprising:

a first liner supply roll for continuously supplying a first liner;

a first medium supply roll for continuously supplying a first medium;

single-faced single-ply corrugated paperboard forming means adapted for receiving the first liner and the first medium from the first liner supply roll and the first medium supply roll, respectively, to corrugate the first medium and then bond the corrugated first medium onto the first liner thereby to form a single-faced single-ply corrugated paperboard;

a second medium supply roll for continuously supplying a second medium;

single-faced double-ply corrugated paperboard forming means adapted for receiving the single-faced single-ply corrugated paperboard and the second medium from the single-faced single-ply corrugated paperboard forming station and the second medium supply roll, respectively, to corrugate the second medium and then bond the corrugated second medium to the single-faced single-ply corrugated paperboard thereby to form a single-faced double-ply corrugated paperboard;

a paper guide arranged downstream the single-faced double-ply corrugated paperboard forming means for controlling a feeding speed of the single-faced double-ply corrugated paperboard;

a tension roll and pre-heating means both arranged downstream the paper guide and adapted to apply a tension to the single-faced double-ply corrugated paperboard;

a second liner supply roll arranged upstream the pre-heating means for supplying a second liner along a path parallel to the single-faced double-ply corrugated paperboard passing through the paper guide;

adhesive coating means adapted for coating adhesive onto the second corrugated medium of the single-faced double-ply corrugated paperboard and/or the second liner; and a heating plate and a pressing belt for pressing the adhesive-applied single-faced double-ply corrugated paperboard and the second liner while heating them thereby bonding them together.

13. The apparatus in accordance with claim 12, wherein each of the first and second single-faced corrugated paperboard forming means comprises:

a pair of vertically arranged corrugator rollers adapted to guide the corresponding medium therebetween and to corrugate the guided medium to have a desired wave;

an adhesive coating roller arranged on one side of the upper one of the corrugator rollers and adapted to uniformly coat an adhesive on one surface of the corrugated medium; and a laminating unit constituted by a press belt and a pair of belt driving rolls all disposed above the upper corrugator roller and adapted to bring the liner in the case of the first forming means or the single-faced corrugated paperboard in the case of the second forming means into contact with the corrugated medium passing over the upper corrugator roller.

14. The apparatus in accordance with claim 13, wherein the corrugator rollers are vertically arranged to engage with each other such that a regular wave of the corresponding medium is continuously formed, and the upper corrugator roller is provided at an outer corrugated surface thereof with a plurality of suction holes arranged along each groove thereof, the suction holes serving to maintain the corrugated shape of the corrugated medium until the corrugated medium is bonded to the liner in the case of the first forming means or to the single-faced corrugated paperboard in the case of the second forming means.

15. The apparatus in accordance with claim 14, wherein the corrugator rollers are of a cartridge type enabling a replacement thereof.

16. The apparatus in accordance with claim 12, further comprising:

a pair of speed-adjustable accelerating rolls respectively arranged upstream the first and second single-faced corrugated paperboard forming means, the speed-adjustable accelerating rolls serving to adjust a feeding speed of the liner and a feeding speed of the single-faced corrugated paperboard, respectively; and a pair of guide tension rolls respectively arranged upstream the first and second single-faced corrugated paperboard forming means, the guide tension rolls serving to apply a desired tension to the first and second mediums, respectively.

17. The apparatus in accordance with claim 16, further comprising a pair of suction brakes respectively arranged upstream the speed-adjustable accelerating rolls, the suction brakes serving to control the feeding speed of the liner and the feeding speed of the single-faced corrugated paperboard, respectively.

18. The apparatus in accordance with claim 17, wherein the suction brake for controlling the feeding speed of the single-faced corrugated paperboard is controlled by a corrugation position sensor disposed beneath the speed-adjustable accelerating roll arranged upstream the second single-faced corrugated paperboard forming means, the corrugation position sensor adapted to count positions of corrugations.

19. The apparatus in accordance with claim 12 further comprising a pair of pre-heating means respectively arranged upstream the first and second single-faced corrugated paperboard forming means, the pre-heating means serving to pre-heat the liner and the single-faced corrugated paperboard to a temperature required for their bonding, respectively.

20. The double-ply corrugated paperboard in accordance with claim 1, wherein said spot-bonded portions are intermittently formed on the junction between the valleys of the first corrugated medium and the liner thus allowing the first and second corrugated mediums to move relative to the liner within a range defined between the spot-bonded portions.

21. The double-ply corrugated paperboard in accordance with claim 20, wherein the spot-bonded portions are formed on the junction between the valleys of the first corrugated medium and the liner with at least two nonbonded valleys of the first corrugated medium remaining between neighboring bonded portions.

* * * * *